United States Patent
Santos

(10) Patent No.: US 10,202,064 B1
(45) Date of Patent: Feb. 12, 2019

(54) LOAD SECUREMENT BLOCK

(71) Applicant: Ryan Santos, San Antonio, TX (US)

(72) Inventor: Ryan Santos, San Antonio, TX (US)

(*) Notice: Subject to any disclaimer, the term of this patent is extended or adjusted under 35 U.S.C. 154(b) by 0 days.

(21) Appl. No.: 15/792,152

(22) Filed: Oct. 24, 2017

Related U.S. Application Data

(60) Provisional application No. 62/520,618, filed on Jun. 16, 2017.

(51) Int. Cl.
*B60P 7/08* (2006.01)
*B60P 7/12* (2006.01)

(52) U.S. Cl.
CPC .......... *B60P 7/0869* (2013.01); *B60P 7/0884* (2013.01); *B60P 7/12* (2013.01)

(58) Field of Classification Search
CPC .......... B60P 7/08; B60P 7/0869; B60P 7/0884
See application file for complete search history.

(56) References Cited

U.S. PATENT DOCUMENTS

| | | |
|---|---|---|
| 4,240,557 A | 12/1980 | Dickens |
| 4,658,567 A | 4/1987 | Arada |
| 5,114,010 A * | 5/1992 | Smith ............... B60P 7/0869 206/453 |
| 5,381,898 A * | 1/1995 | Jones ............... B60P 7/0869 206/391 |
| 5,873,460 A | 2/1999 | Reinhardt |
| D412,436 S | 8/1999 | Tsui |
| 6,840,372 B2 | 1/2005 | Giles et al. |
| 2005/0260403 A1 * | 11/2005 | Geary ............... B32B 27/06 428/319.3 |
| 2006/0216127 A1 | 9/2006 | Broadhead et al. |
| 2008/0190807 A1 | 8/2008 | Rotche |
| 2013/0336754 A1 | 12/2013 | Strang et al. |

FOREIGN PATENT DOCUMENTS

| | | | | |
|---|---|---|---|---|
| FR | 1245523 A * | 11/1960 | ............ | B65B 27/00 |
| FR | 2929191 A1 * | 10/2009 | ............ | B60P 7/0869 |
| NL | 1000165 C2 * | 10/1996 | ............ | B60P 7/0869 |

* cited by examiner

*Primary Examiner* — Hilary L Gutman
(74) *Attorney, Agent, or Firm* — Cramer Patent & Design, PLLC; Aaron R. Cramer

(57) ABSTRACT

A load securement block includes a rectangular central block and two (2) rhomboid side blocks integral to opposite lengthwise sides of the central block and positioned in mirror image to each other. The block is made of closed cell high density foam. The block is configured to provide a protective and deformable barrier between a cargo strap and a cargo load being secured in place by the cargo strap. Alternate embodiments having different geometries are also disclosed.

20 Claims, 8 Drawing Sheets

LOAD SECUREMENT BLOCK

RELATED APPLICATIONS

The present invention is a continuation-in-part of, was first described in and claims the benefit of U.S. Provisional Application No. 62/520,618 filed Jun. 16, 2017, the entire disclosures of which are incorporated herein by reference.

FIELD OF THE INVENTION

The present invention relates generally to the field of devices to assist in the securing of bulk loads during transport, particularly on a flatbed trailer.

BACKGROUND OF THE INVENTION

There are countless tractor-trailer trucks that crisscross our country every day. These large vehicles bring just about every object we touch in our daily lives to use. One (1) type of trailer commonly used with large or bulky objects such as PVC pipe, metal pipe, large tubing, and the like is the flatbed trailer. Such a trailer does not only a great job of transporting such bulky loads, but allows access to all three (3) sides of the trailer for loading and unloading purposes. Such trailers and loads often use load straps with a ratcheting mechanism to hold such loads during transit.

While these straps are fastened securely during the initial loading process, shifting loads during transit, especially with loads such as pipe, cause the straps to loosen, and the loads to shift. In severe cases, the load can even fall from the flatbed trailer. Other types of loads can be easily damaged by the high forces of the securing straps placed upon them especially at corners or sharp edges. Accordingly, there exists a need for a means by which load straps used on irregular shaped loads can be properly and safely secured without the disadvantages as described above. The development of the load securing device fulfills this need.

SUMMARY OF THE INVENTION

The inventor has recognized the aforementioned inherent problems and lack in the art and observed that there is a need for a load securing device.

It is therefore an object of the invention to provide a load securing device, comprising a base, a first side support and a second side support. The base comprises a base upper surface, a base lower surface, a base first side and a base second side opposite the base first side. The first side support is coextensive with the base first side and comprises a first side support upper surface and a first side support lower surface. The second side support is coextensive with the base second side and comprises a second side support upper surface and a second side support lower surface. The first side support upper surface extends upward and away at a first angle from the base upper surface. The second side support upper surface extends upward and away at a second angle from the base upper surface, in mirror image to the first side support upper surface, wherein a groove is defined therein. The first side support lower surface extends upward and away at the first angle from the base lower surface. The second side support lower surface extends upward and away at the second angle from the base lower surface, in mirror image to the first side support lower surface. The groove is configured to enable passage of a securing strap therethrough. The device comprises compressible material.

A first separate embodiment may comprise the above and include a coating which is adhered to the base upper surface, the first side upper surface and the second side upper surface. A second embodiment may comprise the above limitations, without the coating, and have a second groove which is oriented perpendicular to the first groove, passing through the first side support upper surface, across the base upper surface and through the second side support upper surface. A third embodiment may comprise the above limitations, with the coating, and a second groove which is oriented parallel to the first groove and through the base upper surface.

The first angle and the second angle may be one hundred sixty degrees (160°). The length of the device may be twelve inches. The width of the device may be six inches (6 in.). The height of the device may be less than four inches (4 in.).

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
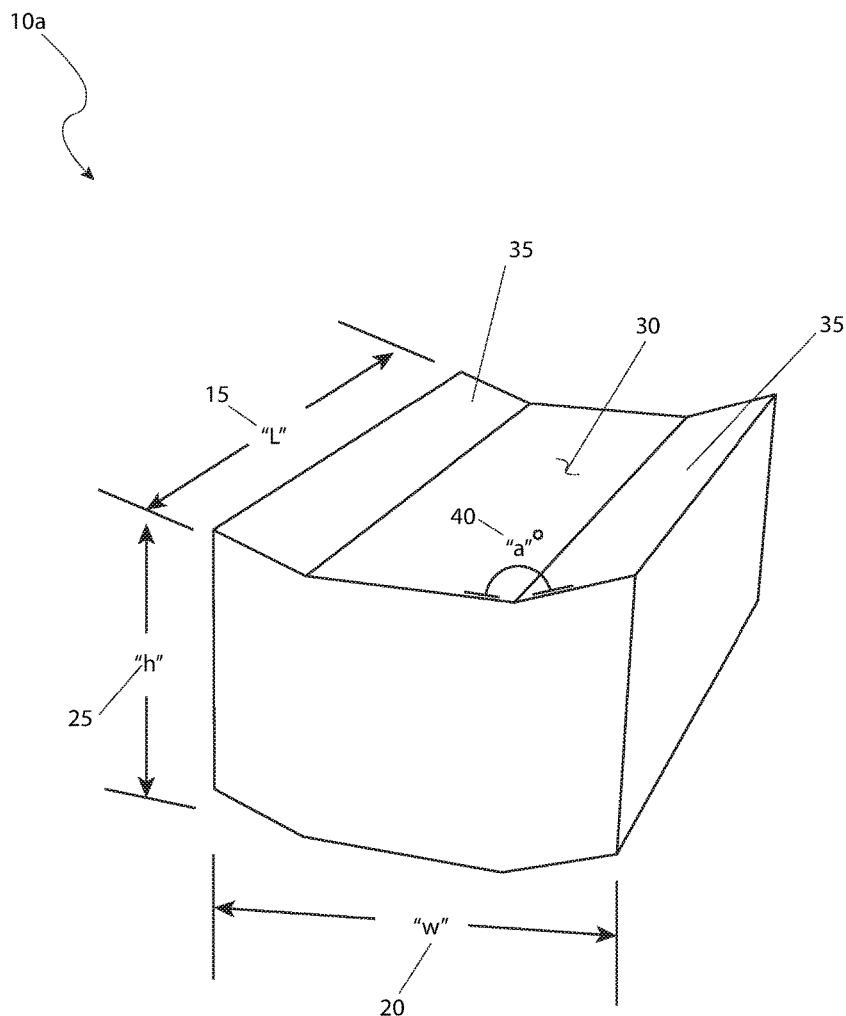
FIG. 1 is an isometric view of the flatbed trailer load securing device 10, according to a first embodiment of the present invention.

DESCRIPTIVE KEY 10 flatbed trailer load securing device
15 length "l"
20 width "w"
25 height "h"
30 first groove
35 angled side support
40 angle "a"
45 linear load
50 transport device
55 securing device
60 slide travel "s"
65 durable upper coating
70 second groove
75 symmetrical load
80 chain groove
85 heavy durable coating
90 securing chain

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, an isometric view of the flatbed trailer load securing device 10, according to a first embodiment of the present invention is disclosed. All embodiments of the flatbed trailer load securing device 10 (herein described as the "device") 10, are used to enhance the physical securement of linear loads on flatbed trailers or equivalent transport vehicles. All embodiments are intended for use with existing securing devices such as ratcheting straps, chains, elastic straps, or the like. All embodiments of the flatbed trailer load securing device 10 are manufactured from closed cell high density foam or equivalent durable material. The material of construction is not intended to be a limiting factor of the present invention. All embodiments are envisioned to have a length "l" 15 of about twelve inches (12 in.), a width "w" 20 of about six inches (6 in.), and a height "h" 25 of either two inches (2 in.) or four inches (4 in.) thick depending on the model. A preferred embodiment is envisioned to have a length "l" 15 of eleven inches (11 in.), a width "w" 20 of seven inches (7 in.), and the same height. It is envisioned that all embodiments would be sold and utilized in multiple sets with at least one (1), but possibly two (2), three (3) or more used with each individual securing device (ratcheting strap, chain, cord, cable, or the like. All embodiments would be intended for re-use multiple times, although disposable use could also be considered, ideally as part of a recycling program. The first embodiment, as disclosed, is provided with a first groove 30 formed by two (2) angled side supports 35 placed at an angle "a" 40 to the base of the first groove 30. The angle "a" 40 is envisioned to be approximately one hundred sixty degrees (160°), repeated symmetrically on both angled side supports 35. This angle is repeated on the bottom surface, thereby enabling even stacking of adjacent devices 10.

Referring next to FIG. 2a, a perspective view of the device 10, shown in a utilized state, according to a first embodiment of the present invention is depicted. The device 10 is utilized upon a linear load 45 such pipes (as shown), steel bar stock, wood, conduit, or the like. It is placed up a transport device 50 such as a flatbed trailer (as shown), a flatbed truck, pickup truck utility trailer or the like. The use of the device 10 upon any particular type of transport device 50 is not intended to be a limiting factor of the present invention. The device 10, according to the first embodiment is placed perpendicular to the axis of the linear load 45. It is secured in place via one (1) or more securing devices 55 such as ratcheting straps (as shown), chains, cables, ropes, or the like.

While the figure discloses one (1) device 10 per securing devices 55, it is envisioned that multiple device 10 could be utilized with each securing device 55. If additional device 10 are needed, they can be placed end to end and/or stacked to fulfill securement needs. A device 10 would be placed wherever gaps between the linear load 45 and the securing devices 55 exist. As the securing devices 55 is tightened in a normal manner, the device 10 deforms to match the shape of the linear load 45. As such, the device 10 prevents irregular shaped linear load 45 from moving about during travel, ensures even pressure is applied to the linear load 45, and helps eliminate pressure point damage in the case of fragile or easily deformed linear load 45. Since even and continuous pressure is applied at all times, the device 10 also reduce the chances of the linear load 45 from unwanted slide travel "s" 60.

Figure 2:
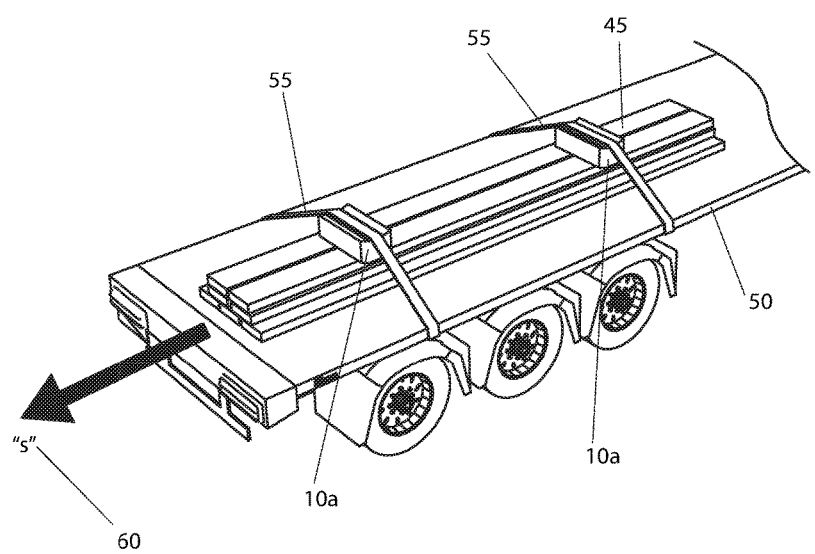
FIG. 2 is a perspective view of the flatbed trailer load securing device 10, shown in a utilized state, according to a first embodiment of the present invention.
Figure 3:
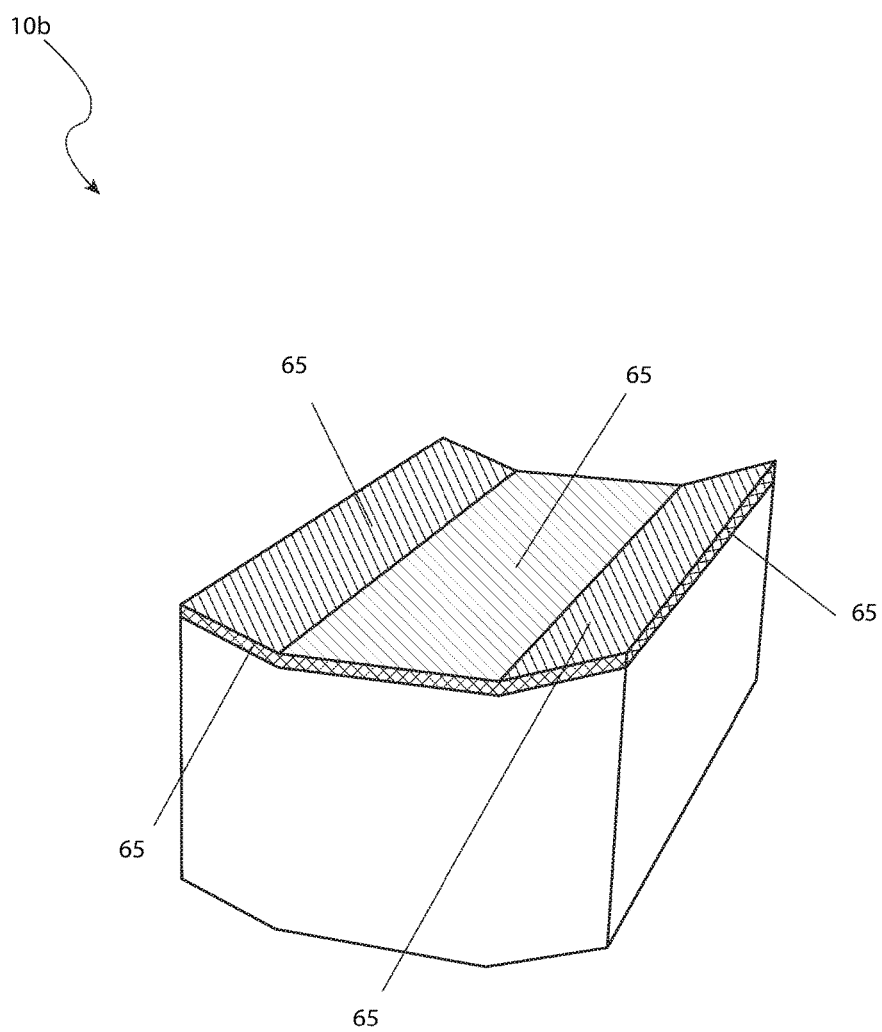
FIG. 3 is an isometric view of the flatbed trailer load securing device 10, according to a second embodiment of the present invention.

Referring now to FIG. 3, an isometric view of the device 10, according to a second embodiment of the present invention is shown. The second embodiment possesses all features and traits of the first embodiment as shown in FIG. 1, with the exception of a durable upper coating 65. The durable upper coating 65 is envisioned to be manufactured of a flexible durable coating to help withstand heavy wear and tear impressed upon the first groove 30 by securing devices 55 (as shown in FIG. 2). It is envisioned that the durable upper coating 65 would be manufactured from a rubberized coating compound, a resin-based mixture, or similar material. The use or non-use of any specific type of durable upper coating 65 is not intended to be a limiting factor of the present invention.

Figure 4:
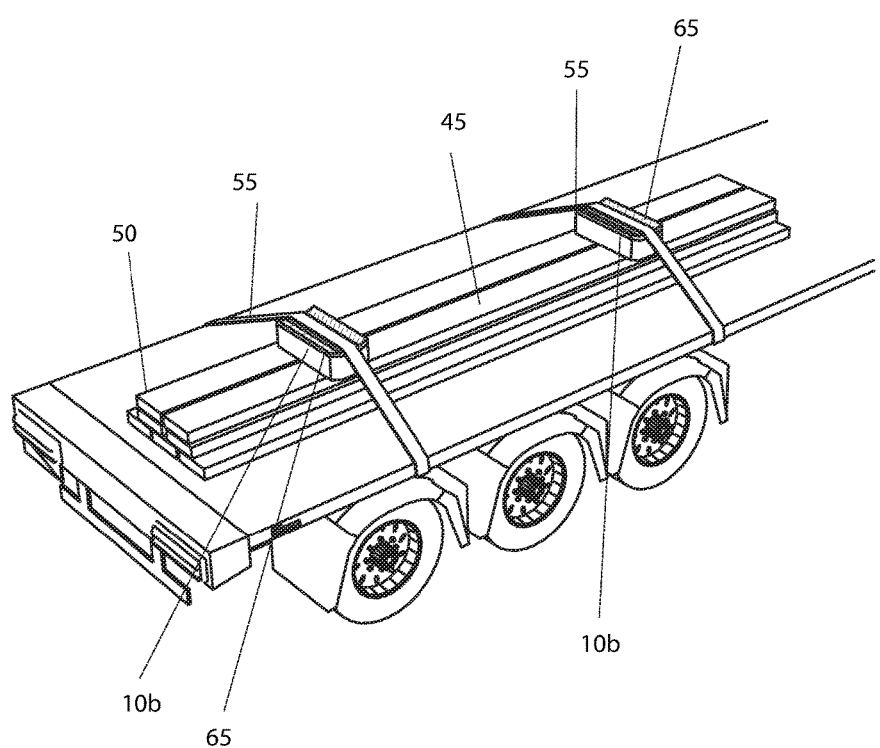
FIG. 4 is a perspective view of the flatbed trailer load securing device 10, shown in a utilized state, according to a second embodiment of the present invention.

Referring next to FIG. 4, a perspective view of the device 10, shown in a utilized state, according to a second embodiment of the present invention is disclosed. As previously described in FIG. 2, the device 10 is utilized upon the linear load 45 such pipes (as shown), steel bar stock, wood, conduit, or the like. The device 10, according to the second embodiment is placed perpendicular to the axis of the linear load 45. It is secured in place via one (1) or more securing devices 55. While the figure discloses one (1) device 10 per securing devices 55, it is envisioned that multiple device 10 could be utilized with each securing device 55. If additional device 10 are needed, they can be placed end to end and/or stacked to fulfill securement needs. A device 10 would be placed wherever gaps between the linear load 45 and the securing devices 55 exist. As the securing devices 55 is tightened in a normal manner, the device 10 deforms to match the shape of the linear load 45. As such, the device 10 prevents irregular shaped linear load 45 from moving about during travel, ensures even pressure is applied to the linear load 45, and helps eliminate pressure point damage in the case of fragile or easily deformed linear load 45. The durable upper coating 65 is envisioned to prevent excessive abrasive wear from direct contact with the securing devices 55 and thus provides for an extended usage cycle under repeated conditions.

Figure 5:
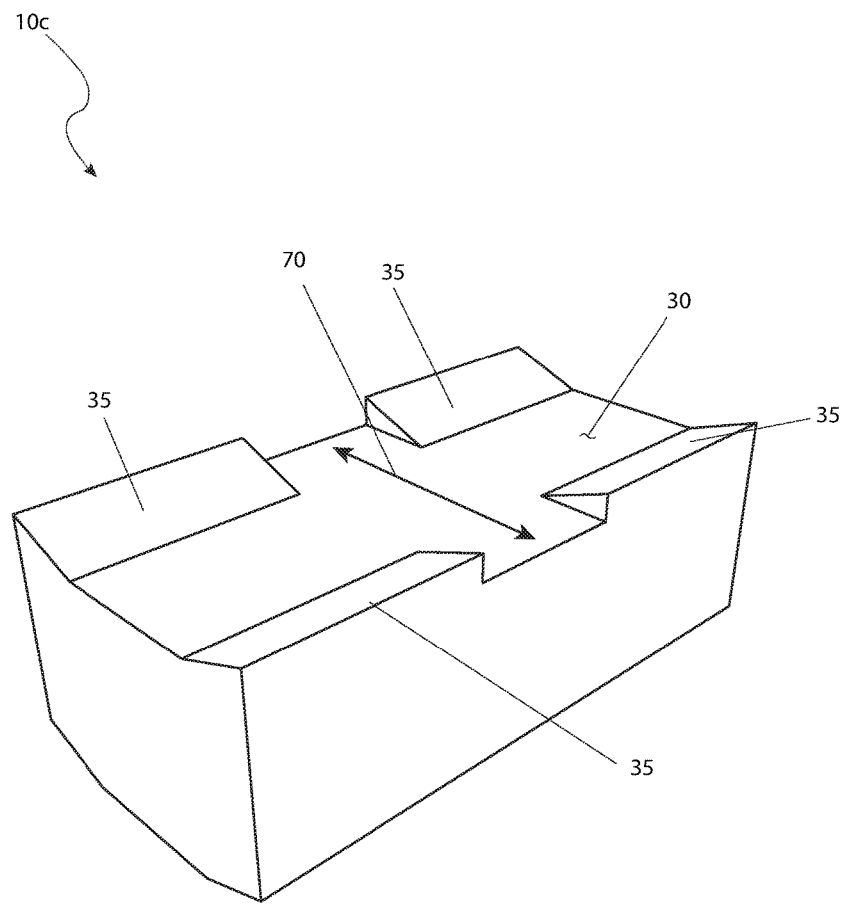
FIG. 5 is an isometric view of the flatbed trailer load securing device 10, according to a third embodiment of the present invention.

Referring now to FIG. 5, an isometric view of the device 10, according to a third embodiment of the present invention is depicted. The third embodiment of the device 10 is provided with a first groove 30, similar to the first embodiment, but is also provided with a second groove 70. The second groove 70 is provided at ninety degrees (90°) relative to the first groove 30. The second groove 70 is formed by removing a section from each of the two (2) angled side supports 35 to present a width that accommodates a typical securing device 55. It is envisioned that the third embodiment of the device 10 could be provided without a durable upper coating 65 (as shown in FIG. 1 and FIG. 2) with a durable upper coating 65 (as shown in FIG. 3 and FIG. 4). This third embodiment of the device 10 would be utilized in applications in which transported loads require securement along multiple axes, as will be described in further detail herein below, or enabling either the first groove 30 or second groove 70 to accommodate the securing device 55.

Figure 6:
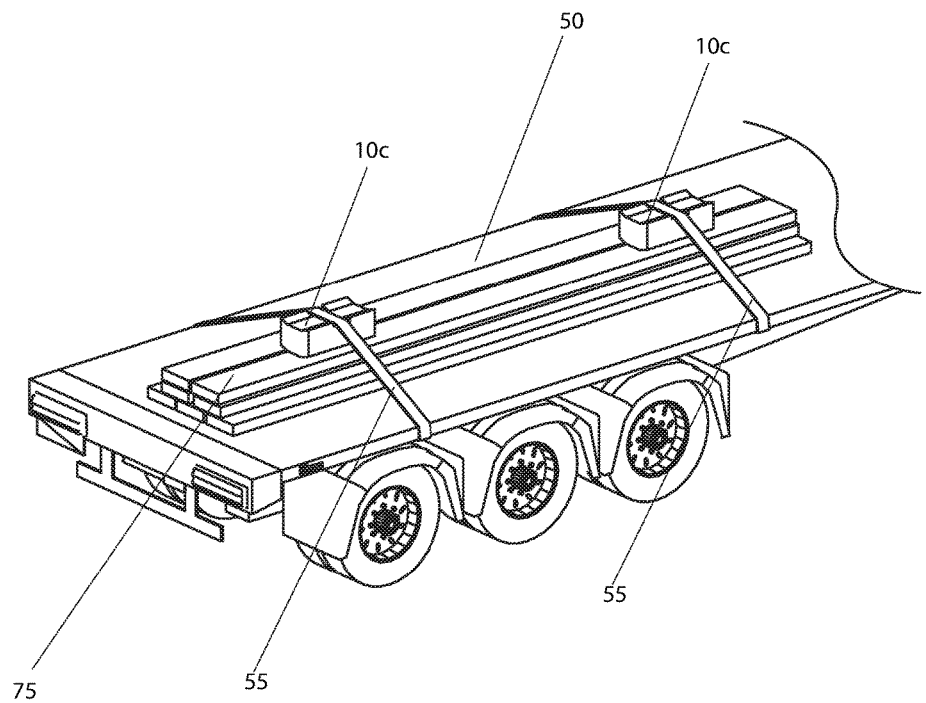
FIG. 6 is a perspective view of the flatbed trailer load securing device 10, shown in a utilized state, according to a third embodiment of the present invention.

Referring next to FIG. 6, a perspective view of the device 10, shown in a utilized state, according to a third embodiment of the present invention is shown. The third embodiment of the device 10 is placed upon a symmetrical load 75 that would benefit from securement along the second groove 70. As aforementioned described, the symmetrical load 75 is placed up a transport device 50 such as a flatbed trailer (as shown), a flatbed truck, pickup truck utility trailer or the like. The device 10, according to the third embodiment, is placed to align with the axes of the symmetrical load 75, envisioned to be parallel to a square or rectangular surface, and is typically used for loads 75 where the device 10 cannot easily or securely be placed lengthwise along the load 75 and must be placed widthwise. It is secured in place via a securing device 55 such as ratcheting straps (as shown), chains, cables, ropes, or the like. If additional devices 10 are needed, such as those associated with the first embodiment or second embodiment, they can be placed on other bearing surfaces such as edges of the symmetrical load 75 to fulfill securement needs. Also, as before, as the securing device 55 is tightened in a normal manner, the third embodiment of the device 10 deforms to match the shape of the symmetrical load 75.

Figure 7:
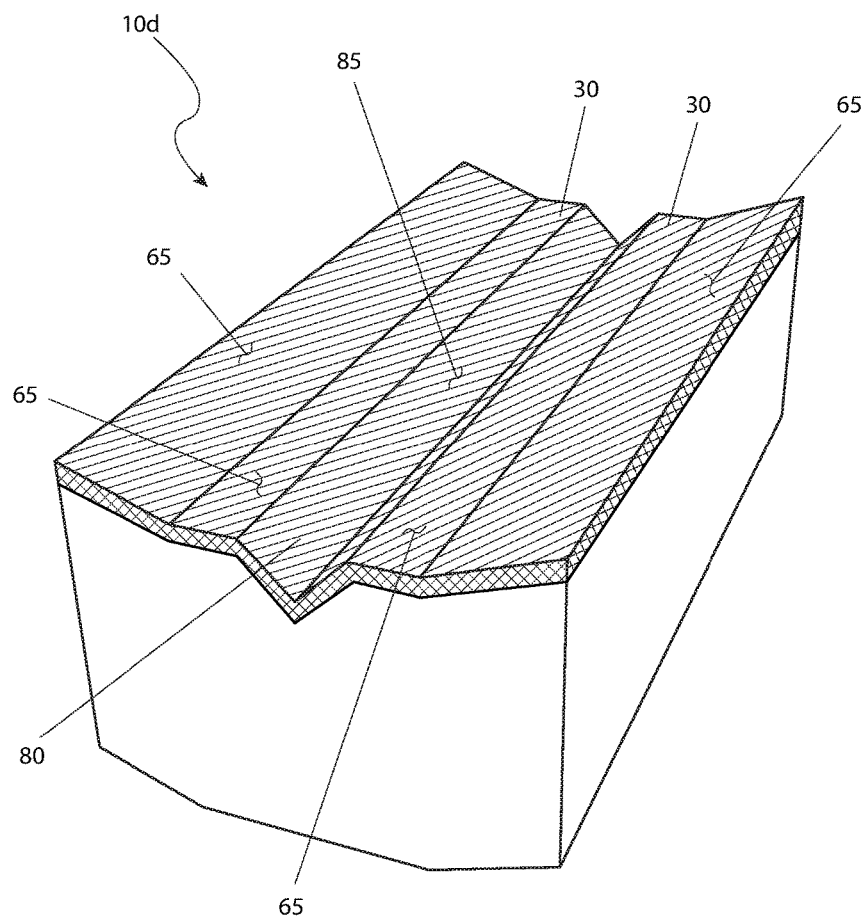
FIG. 7 is an isometric view of the flatbed trailer load securing device 10, according to a fourth embodiment of the present invention; and, FIG. 8 is a perspective view of the flatbed trailer load securing device 10, shown in a utilized state, according to a fourth embodiment of the present invention.

Referring now to FIG. 7, an isometric view of the device 10, according to a fourth embodiment of the present invention is disclosed. The fourth embodiment of the device 10 follows all of the disclosure of the second embodiment including that of the durable upper coating 65. An added feature is a chain groove 80 provided in the center of the first groove 30. The fourth embodiment is intended for use with securing chains as the centering nature of the chain groove 80 will help keep said chains centered on the device 10. The first groove 30 is provided with the durable upper coating 65 while the chain groove 80 is provided with a heavy durable coating 85 consisting of extra thickness and/or extra coats. The heavy durable coating 85 would protect the device 10 from the abrasive and cutting nature of the securing chains thus preventing premature damage to the device 10.

Figure 8:
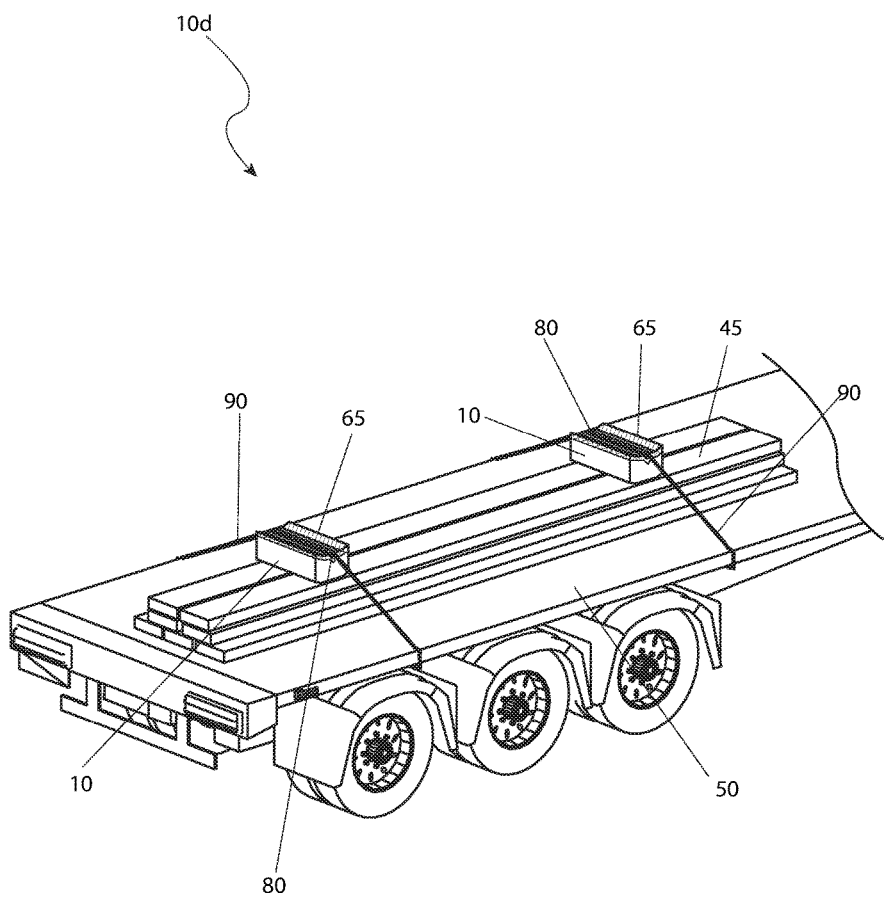

Referring finally to FIG. 8, a perspective view of the flatbed trailer load securing device 10, shown in a utilized state, according to a fourth embodiment of the present invention is depicted. The fourth embodiment of the device 10 is utilized upon a linear load 45 such pipes (as shown), steel bar stock, wood, conduit, or the like. It is placed up the transport device 50 such as a flatbed trailer (as shown), a flatbed truck, pickup truck utility trailer or the like. The device 10, according to the fourth embodiment is placed perpendicular to the axis of the linear load 45. It is secured in place via one (1) or more securing chains 90 utilizing the chain groove 80 in a parallel alignment. While the figure discloses one (1) device 10 per securing chains 90, it that multiple device 10 could be utilized with each securing device 55. If additional device 10 are needed, they can be placed end to end and/or stacked to fulfill securement needs. A device 10 would be placed wherever gaps between the linear load 45 and the securing chains 90 exists. As the securing chains 90 is tightened in a normal manner, the device 10 deforms to match the shape of the linear load 45. As such, the device 10 prevents irregular shaped linear load 45 from moving about during travel, ensures even pressure is applied to the linear load 45, and helps eliminate pressure point damage in the case of fragile or easily deformed linear load 45.

The preferred embodiment of the present invention can be utilized by the common user in a simple and effortless manner with little or no training. It is envisioned that the device 10 would be constructed in general accordance with FIG. 1 through FIG. 8. It is envisioned that the device 10 would be obtained in multiple sets of either the first, second, third, or fourth embodiment depending on the nature of transportation work involved, periods of use, type of linear load 45 or symmetrical load 75 being transported and other situational factors.

The device 10 would be utilized according to the following procedure: A linear load 45 or symmetrical load 75 would be placed upon the transport device 50 in a conventional manner; a first, second or fourth embodiment of the device 10 would be used with linear load 45, a third embodiment would be utilized with symmetrical load 75; securing devices 55 would be applied across the first, second or fourth embodiment of the device 10 as well as the linear load 45; securing chains 90 would be applied across the third embodiment of the device 10 as well as the linear load 45; additional embodiments of the device 10 would be added as required to protect the linear load 45 and symmetrical load 75 as well as prevent movement; the securing devices 55 and/or securing chains 90 would be tightened in a normal manner; and then transport can commence.

Upon completion of transport, the securing devices 55 or securing chains 90 would be loosened or removed, all embodiment of the device 10 would be retrieved and stored for future usage, and the linear load 45 or symmetrical load 75 would be removed from the transport device 50.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A load securing device, comprising:
   a base comprising:
      a base upper surface;
      a base lower surface;
      a base first side;
      a base second side opposite said base first side;
   a first side support coextensive with said base first side comprising:
      a first side support upper surface; and,
      a first side support lower surface; and,
   a second side support coextensive with said base second side comprising:
      a second side support upper surface; and,
      a second side support lower surface;
   wherein said first side support upper surface extends upward and away at a first angle from said base upper surface;
   wherein said second side support upper surface extends upward and away at a second angle from said base upper surface, in mirror image to said first side support upper surface, wherein a groove is defined therein;

wherein said first side support lower surface extends upward and away at said first angle from said base lower surface;

wherein said second side support lower surface extends upward and away at said second angle from said base lower surface, in mirror image to said first side support lower surface;

wherein said groove is configured to enable passage of a securing strap therethrough; and, wherein said device comprises compressible material.

2. The device of claim 1, wherein said first angle and said second angle is 160°.

3. The device of claim 2, wherein a length of said device is twelve inches.

4. The device of claim 3, wherein a width of said device is six inches.

5. The device of claim 4, wherein a height of said device is less than four inches.

6. A load securing device, comprising:
   a base comprising:
      a base upper surface;
      a base lower surface;
      a base first side;
      a base second side opposite said base first side;
   a first side support coextensive with said base first side comprising:
      a first side support upper surface; and,
      a first side support lower surface;
   a second side support coextensive with said base second side comprising:
      a second side support upper surface; and,
      a second side support lower surface; and,
   a coating adhered to said base upper surface, said first side upper surface and said second side upper surface;

wherein said first side support upper surface extends upward and away at a first angle from said base upper surface;

wherein said second side support upper surface extends upward and away at a second angle from said base upper surface, in mirror image to said first side support upper surface, wherein a groove is defined therein between;

wherein said first side support lower surface extends upward and away at said first angle from said base lower surface;

wherein said second side support lower surface extends upward and away at said second angle from said base lower surface, in mirror image to said first side support lower surface;

wherein said groove is configured to enable passage of a securing strap therethrough; and, wherein said device comprises compressible material.

7. The device of claim 6, wherein said first angle and said second angle is 160°.

8. The device of claim 7, wherein a length of said device is twelve inches.

9. The device of claim 8, wherein a width of said device is six inches.

10. The device of claim 9, wherein a height of said device is less than four inches.

11. A load securing device, comprising:
   a base comprising:
      a base upper surface;
      a base lower surface;
      a base first side;
      a base second side opposite said base first side;
   a first side support coextensive with said base first side comprising:
      a first side support upper surface; and,
      a first side support lower surface; and,
   a second side support coextensive with said base second side comprising:
      a second side support upper surface; and,
      a second side support lower surface;

wherein said first side support upper surface extends upward and away at a first angle from said base upper surface;

wherein said second side support upper surface extends upward and away at a second angle from said base upper surface, in mirror image to said first side support upper surface, wherein a first groove is defined therebetween;

wherein a second groove is oriented perpendicular to said first groove, passing through said first side support upper surface, across said base upper surface and through said second side support upper surface;

wherein said first side support lower surface extends upward and away at said first angle from said base lower surface;

wherein said second side support lower surface extends upward and away at said second angle from said base lower surface, in mirror image to said first side support lower surface;

wherein said first groove is configured to enable passage of a securing strap therethrough;

wherein said second groove is configured to enable passage of a securing strap therethrough; and, wherein said device comprises compressible material.

12. The device of claim 11, wherein said first angle and said second angle is 160°.

13. The device of claim 12, wherein a length of said device is twelve inches.

14. The device of claim 13, wherein a width of said device is six inches.

15. The device of claim 14, wherein a height of said device is less than four inches.

16. A load securing device, comprising:
   a base comprising:
      a base upper surface;
      a base lower surface;
      a base first side;
      a base second side opposite said base first side;
   a first side support coextensive with said base first side comprising:
      a first side support upper surface; and,
      a first side support lower surface;
   a second side support coextensive with said base second side comprising:
      a second side support upper surface; and,
      a second side support lower surface; and,
   a coating adhered to said base upper surface, first side upper surface and second side upper surface;

wherein said first side support upper surface extends upward and away at a first angle from said base upper surface;

wherein said second side support upper surface extends upward and away at a second angle from said base upper surface, in mirror image to said first side support upper surface, wherein a first groove is defined therebetween;

wherein a second groove is oriented parallel to said first groove and through said base upper surface;

wherein said first side support lower surface extends upward and away at said first angle from said base lower surface;

wherein said second side support lower surface extends upward and away at said second angle from said base lower surface, in mirror image to said first side support lower surface;

wherein said first groove is configured to enable passage of a securing strap therethrough;

wherein said second groove is configured to enable passage of a securing strap therethrough; and, wherein said device comprises compressible material.

17. The device of claim 16, wherein said first angle and said second angle is 160°.

18. The device of claim 17, wherein a length of said device is twelve inches.

19. The device of claim 18, wherein a width of said device is six inches.

20. The device of claim 19, wherein a height of said device is less than four inches.

\* \* \* \* \*